United States Patent
Haidari

(10) Patent No.: US 9,263,094 B2
(45) Date of Patent: Feb. 16, 2016

(54) HARD DISK DRIVE DISK SEPARATOR PLATE CONSTRUCTION

(71) Applicant: HGST Netherlands B.V., Amsterdam (NL)

(72) Inventor: Mehdi S. Haidari, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/189,954

(22) Filed: Feb. 25, 2014

(65) Prior Publication Data

US 2015/0243319 A1    Aug. 27, 2015

(51) Int. Cl.
*G11B 33/08* (2006.01)
*G11B 33/14* (2006.01)

(52) U.S. Cl.
CPC .............. *G11B 33/148* (2013.01); *G11B 33/08* (2013.01)

(58) Field of Classification Search
CPC ...... G11B 5/6005; G11B 33/08; G11B 33/148
USPC ...................... 360/97.13, 97.14, 97.15, 97.19
See application file for complete search history.

(56) References Cited

U.S. PATENT DOCUMENTS

| | | | |
|---|---|---|---|
| 5,538,774 A | 7/1996 | Landin et al. | |
| 5,663,851 A | 9/1997 | Jeong et al. | |
| 6,040,957 A | 3/2000 | Konings | |
| 6,128,159 A | 10/2000 | Ino | |
| 6,154,361 A | 11/2000 | Anderson et al. | |
| 6,285,525 B1 | 9/2001 | McCutcheon et al. | |
| 6,542,328 B2 | 4/2003 | Harrison et al. | |
| 6,690,540 B2 | 2/2004 | Hirasaka et al. | |
| 6,721,128 B1 | 4/2004 | Koizumi et al. | |
| 6,757,131 B1 | 6/2004 | Iwahara et al. | |
| 6,930,857 B1* | 8/2005 | Lin et al. ..................... | 360/97.14 |
| 7,256,961 B2 | 8/2007 | Chen et al. | |
| 7,327,530 B2 | 2/2008 | Lee et al. | |
| 7,420,775 B2 | 9/2008 | Lim | |
| 7,453,667 B2 | 11/2008 | Cho et al. | |
| 7,570,453 B2 | 8/2009 | Kim et al. | |
| 7,589,933 B2 | 9/2009 | Ueda et al. | |
| 7,593,181 B1 | 9/2009 | Tsay et al. | |
| 7,787,213 B1 | 8/2010 | Michael et al. | |
| 8,570,682 B2 | 10/2013 | Ichikawa et al. | |
| 2003/0072103 A1 | 4/2003 | Kang et al. | |
| 2005/0270691 A1* | 12/2005 | Pottebaum et al. ........ | 360/97.14 |
| 2006/0066993 A1 | 3/2006 | Agematsu et al. | |
| 2007/0097545 A1 | 5/2007 | Yoo et al. | |
| 2007/0291405 A1* | 12/2007 | Kim .......................... | 360/98.01 |
| 2008/0151420 A1 | 6/2008 | Lee et al. | |
| 2009/0002880 A1 | 1/2009 | Ueda et al. | |

(Continued)

FOREIGN PATENT DOCUMENTS

| | | |
|---|---|---|
| EP | 1868207 A2 | 12/2007 |
| KR | 20010084547 A | 9/2001 |
| KR | 20090096894 A | 9/2009 |

(Continued)

*Primary Examiner* — Craig A. Renner
(74) *Attorney, Agent, or Firm* — John D. Henkhaus

(57) ABSTRACT

Improving track following performance and reliability in a hard disk drive involves the use of disk separator plates positioned between adjacent recording disks, where a disk separator plate is made of stamped metal with plastic over-molded mounting portions coupled to the metal, thereby reducing the reliability risks associated with the use of fiber-filled materials.

17 Claims, 3 Drawing Sheets

(56) References Cited

U.S. PATENT DOCUMENTS

2014/0111883 A1 4/2014 Eguchi et al.
2014/0335371 A1 11/2014 How et al.

FOREIGN PATENT DOCUMENTS

| | | |
|---|---|---|
| KR | 20090096899 A | 9/2009 |
| KR | 20090096900 A | 9/2009 |
| KR | 100931673 B1 | 12/2009 |
| KR | 101010543 B1 | 1/2011 |
| KR | 101010544 B1 | 1/2011 |
| KR | 101020678 B1 | 3/2011 |
| WO | WO2013094703 A1 | 6/2013 |
| WO | WO2013094703 A1 | 6/2013 |
| WO | WO2014158094 A1 | 10/2014 |

* cited by examiner

HARD DISK DRIVE DISK SEPARATOR PLATE CONSTRUCTION

FIELD OF EMBODIMENTS OF THE INVENTION

Embodiments of the invention relate generally to hard disk drives and more particularly to the construction of a disk separator plate.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator.

A read/write head uses a magnetic field to read data from and write data to the surface of a magnetic-recording disk. Write heads make use of the electricity flowing through a coil, which produces a magnetic field. Electrical pukes are sent to the write head, with different patterns of positive and negative currents. The current the coil of the write head induces a magnetic field across the gap between the head and the magnetic disk, which in turn magnetizes a small area on the recording medium.

Increasing areal density (a measure of the quantity of information bits that can be stored on a given area of disk surface) is one of the ever-present holy grails of hard disk drive design evolution. In turn, as recording tracks in HDDs become narrower and narrower, there is a need for more accurate and sustainable head positioning, sometimes referred to as "track following". Furthermore, especially in the case of enterprise-class HDDs, customers mandate meeting stringent performance requirements. One of the factors impairing more robust track following is airflow-induced disk flutter. Thus, the manner in which disk flutter is managed is an important factor in improving the performance of HDDs.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY OF EMBODIMENTS

Embodiments of the invention are directed toward improving track following performance by use of disk separator plates positioned between adjacent disks within a hard disk drive. According to embodiments, a disk separator plate is made of stamped metal with plastic over-molded mounting portions coupled to the metal.

Embodiments discussed in the Summary of Embodiments section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to improving track following performance by use of disk separator plates (also referred to as damper plates) positioned between adjacent disks within a hard disk drive, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
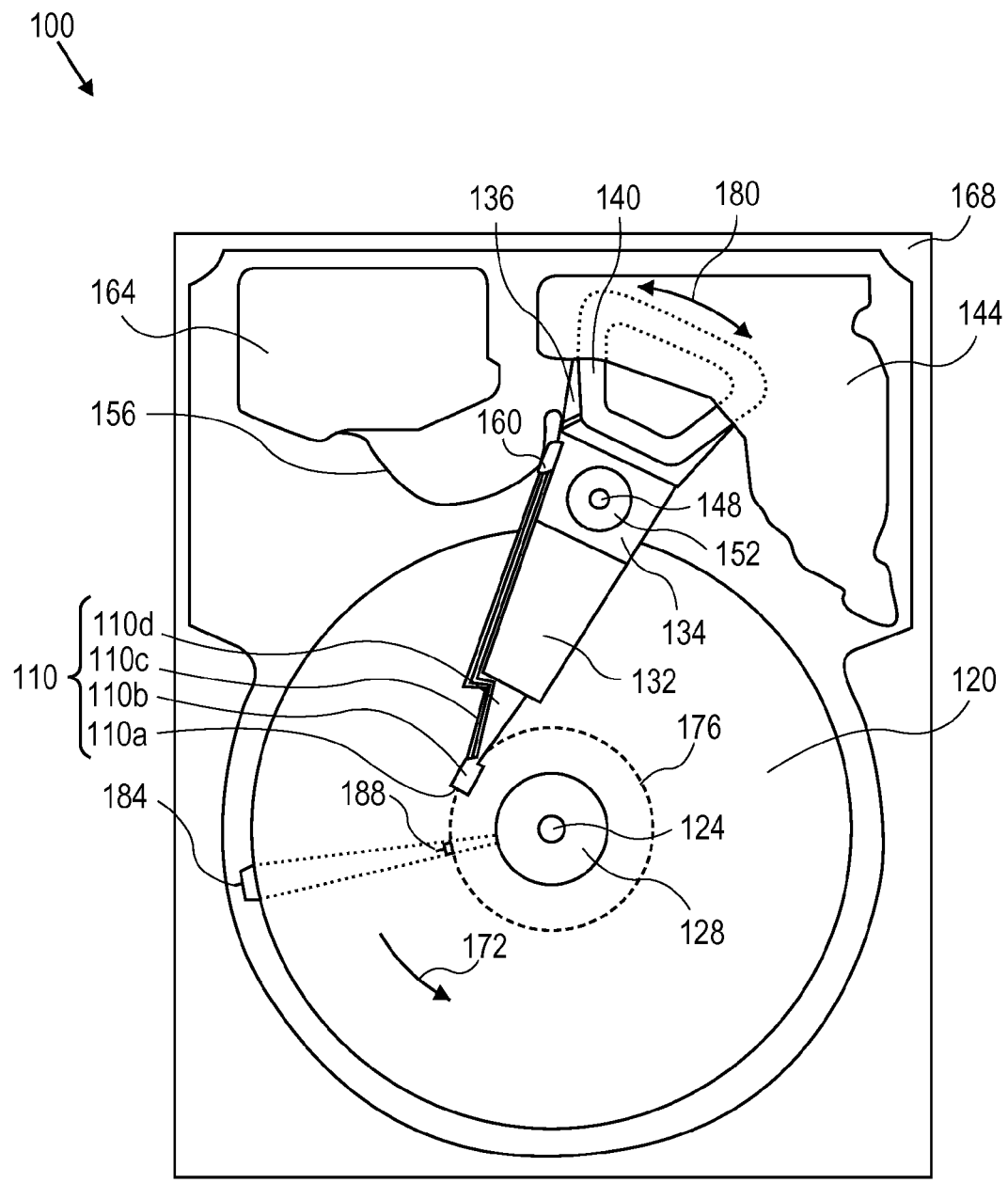
FIG. 1 is a plan view illustrating a hard disk drive, according to an embodiment of the invention.

Embodiments of the invention may be used in the context of improving track following while reducing the risk of debris-related failures in a hard disk drive (HDD). In accordance with an embodiment of the invention, a plan view illustrating an HDD 100 is shown in FIG. 1. FIG. 1 illustrates the functional arrangement of components of the HDD including a slider 110b that includes a magnetic-reading/recording head 110a. Collectively, slider 110b and head 110a may be referred to as a head slider. The HDD 100 includes at least one head gimbal assembly (HGA) 110 including the head slider, a lead suspension 110c attached to the head slider, and a load beam 110d attached to the lead suspension 110c. The HDD 100 also includes at least one magnetic-recording media 120 rotatably mounted on a spindle 124 and a drive motor (not visible) attached to the spindle 124 for rotating the media 120. The head 110a includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not visible). The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

Continuing with reference to FIG. 1, in accordance with an embodiment of the present invention, other electronic components, including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110*b* rides so that the slider 110*b* flies above the surface of the media 120 without making contact with a thin magnetic-recording medium in which information is recorded.

The electrical signal provided to the voice coil 140 of the VCM enables the head 110*a* of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110*a* of the HGA 110 reads the servo-burst-signal pattern which provides a position-error-signal (PES) to the servo electronics, which controls the electrical signal provided to the voice coil 140 of the VCM, enabling the head 110*a* to follow the track 176. Upon finding the track 176 and identifying a particular sectored track portion 188, the head 110*a* either reads data from the track 176 or writes data to the track 176 depending on instructions received by the disk controller from an external agent, for example, a microprocessor of a computer system.

References herein to a hard disk drive, such as HDD 100 illustrated and described in reference to FIG. 1, may encompass a data storage device that is at times referred to as a "hybrid drive". A hybrid drive refers generally to a storage device having functionality of both a traditional HDD (see, e.g., HDD 100) combined with solid-state storage using non-volatile memory, such as flash or other solid-state (e.g., integrated circuits) memory, which is electrically erasable and programmable. As operation, management and control of the different types of storage media typically differs, the solid-state portion of a hybrid drive may include its own corresponding controller functionality, which may be integrated into a single controller with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like.

Introduction

As discussed, there is a need for more accurate and sustainable track following within hard disk drives (HDDs), and that one of the factors impairing more robust track following is airflow-induced disk flutter. In operation, the recording disks within an HDD rotate at high speeds and disk flutter refers to the vibration of the rotating disks generally caused by the airflow and air pressure differentials (e.g., turbulence) induced by the rotating disks in the spaces between the disks. This disk flutter negatively affects the ability of the servo system to precisely and sustainably locate the head over the desired recording track.

One approach to reducing disk flutter in an HDD is the use of plate-shaped dampers interposed between, and extending some distance from the outer perimeter of, adjacent disks within an HDD. The damper plates are typically C-shaped to avoid interference with the actuator arm, and can inhibit the disk vibrations by damping the effect of the compressed air between the disks. Typically, such damper plates are injection-molded plastic parts using fiber-filled material, such as carbon fiber filled plastic resins, due to its enhanced mechanical properties. However, the carbon fibers in these resins pose reliability issues because the fibers tend to dislodge from the damper plate and lodge onto the head slider, which may cause head-disk interactions resulting in data loss or even complete failure of the head and thus the HDD.

Hard Disk Drive Disk Separator Plate

Figure 2:
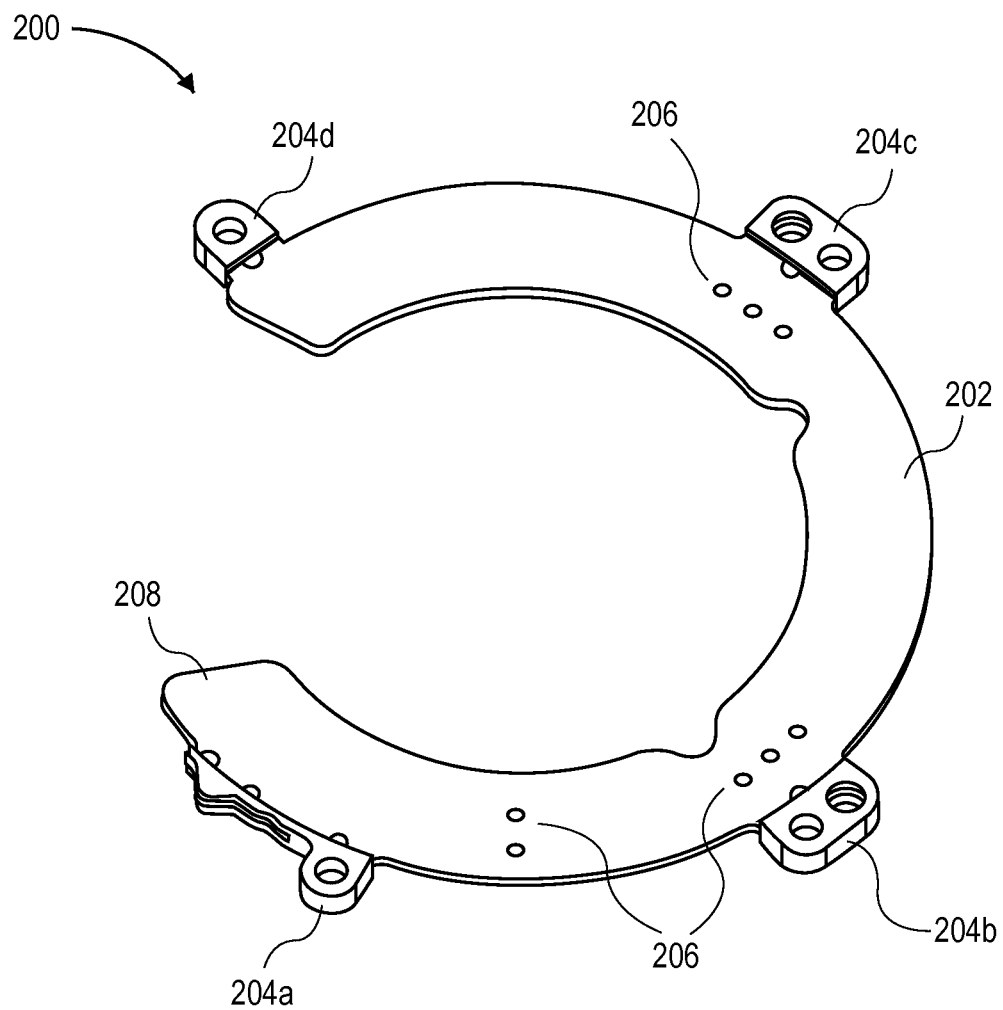
FIG. 2 is a perspective view illustrating a disk separator plate, according to an embodiment of the invention.
Figure 3:
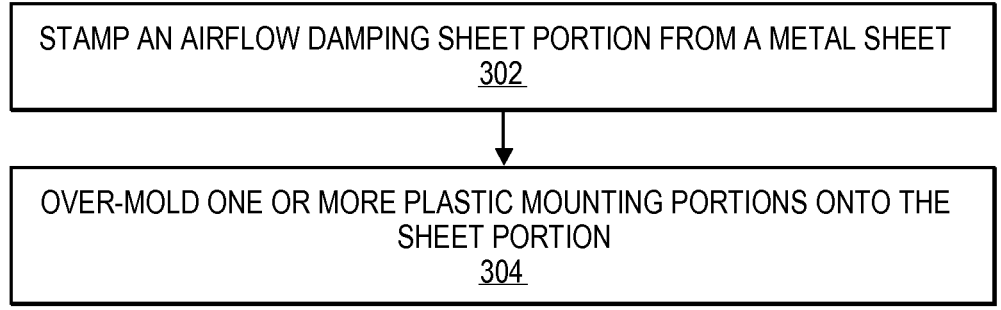
FIG. 3 is a flow diagram illustrating a method of manufacturing a hard disk drive disk separator plate, according to an embodiment of the invention.

FIG. 2 is a perspective view illustrating a disk separator plate (also referred to as a damper plate), and FIG. 3 is a flow diagram illustrating a method of manufacturing a hard disk drive disk separator plate, both of which are according to one or more embodiments of the invention.

According to an embodiment and with reference to FIG. 2, disk separator plate 200 comprises a metal airflow damping sheet portion 202 and one or more molded plastic mounting portion, such as mounting portion 204*a*, 204*b*, 204*c*, 204*d* (collectively, mounting portions 204), molded directly onto the sheet portion 202. For non-limiting examples, the metal sheet portion 202 may be fabricated from stainless steel or aluminum. Use of a metal disk separator plate (e.g., sheet portion 202) eliminates the risk associated with approaches in which a carbon fiber-filled plastic resin is used for fabrication of disk separator plates, such as fiber debris-related compromised data recording/readback, head failure, disk damage, etc. Furthermore, use of over-molded plastic mounting portions (e.g., mounting portion 204) overcomes the limitations associated with the stamping process and allows for the mounting portion 204 to be thicker than the sheet portion 202 and extend away from the plane of the sheet portion 202 in both upper and lower vertical directions.

According to an embodiment and with reference to FIG. 3, at block 302, an airflow damping sheet portion is stamped from a metal sheet. Stamping refers generally to a manufacturing process, typically a sheet-metal forming manufacturing process, such as pressing, punching, bending, flanging, etc. using a machine or stamping press, for non-limiting examples. For example, sheet portion 202 is stamped from an aluminum or stainless steel (e.g., stronger, more rigid) sheet.

At block 304, one or more plastic mounting portion over-molded directly onto the sheet portion. This is in contrast to processes in which the main sheet portion and the mounting portions are fabricated separately and then, in a separate step, combined by sway of a protrusion, screw, or the like. Over-molding refers generally to an injection molding process in which two materials are molded together. For example, sheet portion 202 may be configured with features (e.g., a small stub having a hole or protrusion) in the areas in which the mounting portions 204 are desired, with which the liquefied plastic material can join over-molding process.

According to an embodiment, sheet portion 202 comprises perforations 206, configured to affect the stiffness of the sheet portion 202. For example, if the original stamped sheet portion 202 is too stiff, this could affect the ability of the HDD to meet shock requirements. That is, if the sheet portion 202 is considerably stiffer than other adjacent components then the risk of components contacting in response to a shock event is greater, which is usually troublesome. Thus, the stiffness of the sheet portion 202 can vary from implementation to implementation. Furthermore, the number and locations of perforations 206 that are depicted in FIG. 2 are shown as examples for illustrative purposes. Therefore, the actual number, size, location, and the like, of perforations 206 may vary from implementation to implementation. Thus, an additional and optional action that may be associated with the method of manufacturing of FIG. 3 is to perforate the sheet portion (e.g., sheet portion 202 of FIG. 2) to modify the stiffness of the sheet portion.

According to an embodiment, disk separator plate 200 comprises over-molded plastic 208 which covers at least one side of the sheet portion 202. For example and according to an embodiment, the over-molded plastic 208 used to cover sheet portion 202 is an unfilled plastic, e.g., the over-molded plastic 208 is not a fiber-filled plastic, so that the aforementioned risk associated with fiber debris is reduced. The thickness of the over-molded plastic 208 may be used to optimize for the particular spacing between the disks and, therefore, may vary from implementation to implementation. Thus, an additional and optional action that may be associated with the method of manufacturing of FIG. 3 is to over-mold an unfilled plastic cover (e.g., over-molded plastic 208 of FIG. 2) onto the sheet portion (e.g., sheet portion 202 of FIG. 2), to modify the thickness of the sheet portion.

Disk separator plates 200 (FIG. 2) according to the embodiments described herein may be implemented in multi-disk hard disk drives, interposed between each pair of adjacently stacked disks (e.g., disk 120 of FIG. 1) to combat airflow-induced disk flutter and thus improve track following, and to enhance the HDD reliability. For example, a 3-disk HDD would thus be configured with two disk separator plates 200, one between the first and second disks and one between the second and third disks.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard disk drive disk separator plate comprising:
an airflow damping portion comprising a metal sheet portion; and
a plurality of molded plastic mounting portions each over-molded directly onto said sheet portion.

2. The hard disk drive disk separator plate of claim 1, wherein said sheet portion comprises at least one perforation configured to affect the stiffness of said sheet portion.

3. The hard disk drive disk separator plate of claim 1, wherein said airflow damping portion further comprises:
an over-molded plastic cover over at least one side of said sheet portion thereby affecting the thickness of said airflow damping portion.

4. The hard disk drive disk separator plate of claim 3, wherein said over-molded plastic cover comprises unfilled plastic.

5. The hard disk drive disk separator plate of claim 3, wherein said over-molded plastic cover is configured to affect the thickness of said airflow damping portion based on spacing between disks.

6. The hard disk drive disk separator plate of claim 1, wherein said sheet portion comprises stamped stainless steel.

7. The hard disk drive disk separator plate of claim 1, wherein said sheet portion comprises stamped aluminum.

8. A hard disk drive comprising:
a plurality of recording disks rotatably mounted on a spindle; and
an airflow damper plate positioned between two of said recording disks, said damper plate comprising:
an airflow damping portion comprising a metal sheet portion; and
a plurality of molded plastic mounting portions each over-molded directly onto said sheet portion.

9. The hard disk drive of claim 8, wherein said sheet portion comprises at least one perforation configured to affect the stiffness of said sheet portion.

10. The hard disk drive of claim 8, wherein said airflow damping portion further comprises:
an over-molded plastic cover over at least one side of said sheet portion thereby affecting the thickness of said airflow damping portion.

11. The hard disk drive of claim 10, wherein said over-molded plastic cover comprises unfilled plastic.

12. The hard disk drive of claim 10, wherein said over-molded plastic cover is configured to affect the thickness of said airflow damping portion based on spacing between said two recording disks.

13. The hard disk drive of claim 8, wherein said damper plate sheet portion comprises stamped stainless steel.

14. The hard disk drive of claim 8, wherein said damper plate sheet portion comprises stamped aluminum.

15. A method of manufacturing a hard disk drive disk separator plate, the method comprising:
stamping an airflow damping sheet portion from a metal sheet; and
over-molding a plurality of plastic mounting portions separately onto said sheet portion.

16. The method of claim 15, further comprising:
perforating said sheet portion to modify the stiffness of said sheet portion.

17. The method of claim 15, further comprising:
over-molding an unfilled plastic cover over at least one side of said sheet portion to thicken said disk separator plate.

* * * * *